US009114486B1

(12) United States Patent
Huth et al.

(10) Patent No.: US 9,114,486 B1
(45) Date of Patent: Aug. 25, 2015

(54) ADJUSTABLE WORKING PLATFORM FOR CURVED SURFACES

(71) Applicant: General Electric Company, Schenectady, NY (US)

(72) Inventors: Robert Edward Huth, Greenville, SC (US); John William Herbold, Fountain Inn, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/187,571

(22) Filed: Feb. 24, 2014

(51) Int. Cl.
*E06C 9/04* (2006.01)
*B23P 6/00* (2006.01)

(52) U.S. Cl.
CPC .. *B23P 6/002* (2013.01); *E06C 9/04* (2013.01)

(58) Field of Classification Search
CPC ............... E04G 5/10; E04G 1/15; E06C 9/06; E06C 9/04
See application file for complete search history.

(56) References Cited

U.S. PATENT DOCUMENTS

| | | | |
|---|---|---|---|
| 73,387 A | | 1/1868 | Richmond |
| 84,595 A | | 12/1868 | Van Doran |
| 118,001 A | | 8/1871 | Fisher |
| 168,355 A | | 10/1875 | Talbott, Jr. |
| 799,487 A | | 9/1905 | Neice |
| 1,113,068 A | | 10/1914 | Thomas et al. |
| 4,036,483 A | | 7/1977 | Bohmer et al. |
| 4,102,432 A | * | 7/1978 | Bustin ............................. 182/92 |
| 4,156,996 A | | 6/1979 | Lienhard |
| 4,516,519 A | | 5/1985 | Gulick |
| 5,004,072 A | | 4/1991 | Launer |
| 5,111,908 A | * | 5/1992 | Reiter et al. .................... 182/92 |
| 5,694,720 A | | 12/1997 | Walcher et al. |
| 5,931,257 A | * | 8/1999 | Harden ........................... 182/92 |
| 6,986,523 B1 | * | 1/2006 | Bickford .................... 280/414.1 |
| 7,759,586 B2 | | 7/2010 | Zeiss et al. |
| 8,104,575 B1 | | 1/2012 | Bancroft |
| 8,356,830 B2 | * | 1/2013 | Desjardin .................. 280/414.1 |
| 2003/0050587 A1 | * | 3/2003 | Courser .......................... 602/32 |
| 2005/0223660 A1 | | 10/2005 | Henning, Sr. et al. |
| 2009/0014978 A1 | * | 1/2009 | Shumway .................... 280/166 |
| 2012/0211616 A1 | | 8/2012 | Taylor |

FOREIGN PATENT DOCUMENTS

| | | |
|---|---|---|
| JP | 08199580 | 8/1996 |

* cited by examiner

*Primary Examiner* — Alvin Chin-Shue
(74) *Attorney, Agent, or Firm* — James W. Pemrick; Ernest G. Cusick; Frank A. Landgraff

(57) ABSTRACT

An adjustable working platform for a curved surface includes a support member configured to be inserted into a hole in the curved surface. An adjustable surface is configured for supporting a load, and the adjustable surface is configured to rotate and lock in multiple positions. An anti-rotation arm is connected to the support member, and the anti-rotation arm includes an adjustable section configured to engage an axial facing portion of the curved surface.

20 Claims, 5 Drawing Sheets

ADJUSTABLE WORKING PLATFORM FOR CURVED SURFACES

BACKGROUND OF THE INVENTION

The disclosure is related generally to working platforms for curved surfaces. More particularly, the disclosure is related to a working platform for the curved shell of a gas turbine.

Conventional turbomachines, such as gas turbine systems, are utilized to generate power for electric generators. In general, conventional turbomachines generate power by passing a fluid (e.g., hot gas) through a compressor and a turbine of the turbomachine. More specifically, fluid may flow through a fluid flow path for rotating a plurality of rotating buckets of the turbine for generating the power. The fluid may be directed through the turbine via the plurality of rotating buckets and a plurality of stationary nozzles positioned between the rotating buckets. These internal components (e.g., buckets, nozzles) may be included within a turbine shell of the turbine. The turbine shell may act as a housing for the internal components and the fluid passing through the turbine during operation of the turbomachine.

When service or maintenance must be performed on the internal components of the turbomachine, the exterior coverings of each portion of the turbomachine (e.g., compressor, turbine) typically must be removed. More specifically, when inspection and/or maintenance must be performed on the internal components (e.g., buckets, nozzles) of the turbine, at least a portion of the turbine shell must be removed to allow operators access to these internal components. The rotor may also be removed as well as the stator vanes or nozzles. When all components are removed, the turbine shell is basically empty and presents a curved surface with few places for a technician to stand. Some turbines can be quite large and the radius of the shell can be taller than some technicians. Therefore, it can be difficult for the technicians to reach certain portions of the shell to perform a desired service or maintenance task. As a result, service and/or maintenance of the turbomachine and its shell may present ergonomic challenges, and technicians may have to improvise working platforms that may not always be configured in the safest manner possible.

BRIEF DESCRIPTION OF THE INVENTION

According to an aspect of the present invention, an adjustable working platform for a curved surface includes a support member configured to be inserted into a hole in the curved surface. An adjustable surface is configured for supporting a load, and the adjustable surface is configured to rotate and lock in multiple positions. An anti-rotation arm is connected to the support member, and the anti-rotation arm includes an adjustable section configured to engage an axial facing portion of the curved surface.

According to another aspect of the present invention, an adjustable working platform for a curved surface includes a support member configured to be inserted into a hole in the curved surface. The curved surface is the interior of a gas turbine shell. An adjustable surface is configured for supporting a load, and the adjustable surface is configured to rotate and lock in multiple positions. An anti-rotation arm is connected to the support member, and the anti-rotation arm includes an adjustable section configured to engage an axial facing portion of the curved surface of the gas turbine shell.

BRIEF DESCRIPTION OF THE DRAWINGS

These and other aspects of this invention will be more readily understood from the following detailed description of the various aspects of the invention taken in conjunction with the accompanying drawings that depict various embodiments of the invention, in which.

Figure 1:
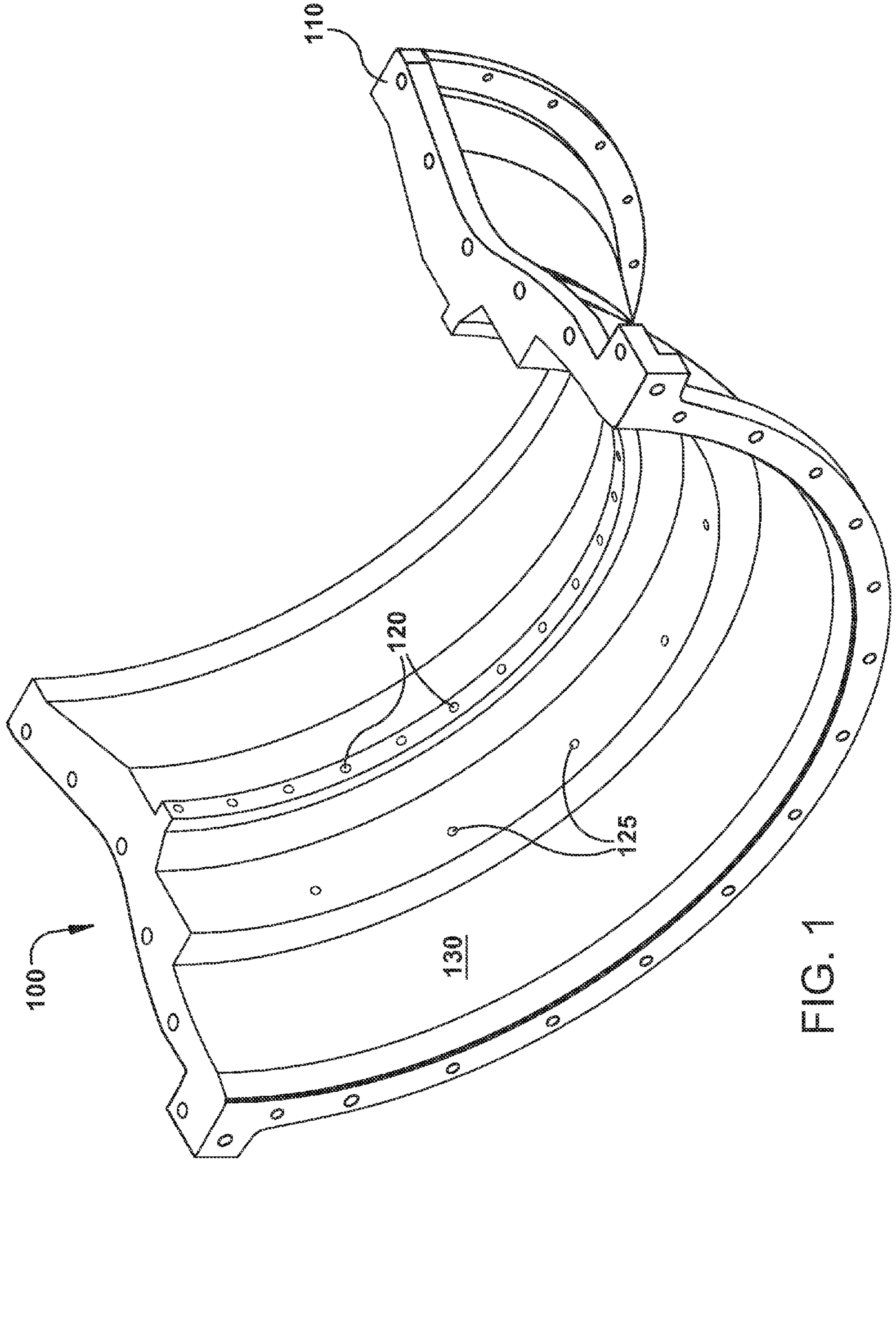
FIG. 1 illustrates a perspective view the lower half of a gas turbine shell.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As described herein, aspects of the invention relate to turbomachines. Specifically, as described herein, aspects of the invention relate to an apparatus for moving a turbine shell of the turbomachine.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

FIG. 1 illustrates a perspective view the lower half of a gas turbine shell. A gas turbine typically includes an outer shell that contains various stationary and moving parts. For example, stator vanes or nozzles, and various seals are stationary elements that are mounted on the shell. The rotor shaft and rotor blades are rotating elements and are also contained within the shell, but these elements are supported by various bearings. The lower half of shell 100 is depicted in FIG. 1. The shell 100 includes a horizontal flange 110 that mates with a corresponding flange of a top half of the shell. The shell 100 may also include various holes for 120 for anchoring stationary elements. For example, holes 120 may be nozzle pin holes which are used to keep the nozzle anchored. Holes 125 may be used for various sensors, such as temperature or pressure sensors. The interior of the shell 100 has a curved surface 130 that includes a series of ribs, slots and valleys. As will be described hereinafter, these holes can be used to facilitate service on the turbine.

Figure 2:
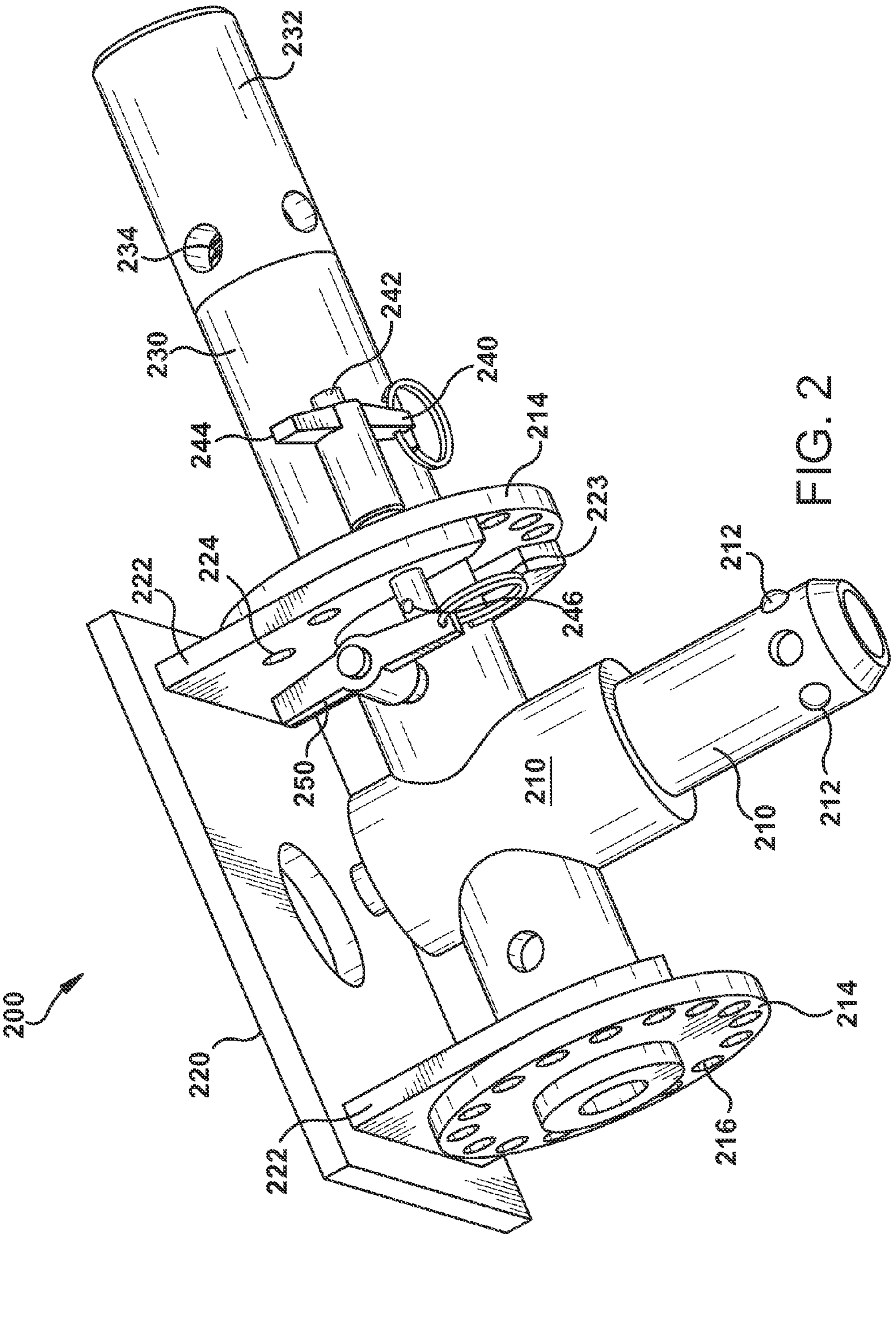
FIG. 2 illustrates a perspective view of an adjustable working platform, according to an aspect of the present invention.

FIG. 2 illustrates a perspective view of an adjustable working platform 200, according to an aspect of the present invention. The platform 200 can be used to provide a stable working surface on any curved surface having appropriate mounting features. For example, the platform may be used on turbomachine (e.g., gas turbines, steam turbines, compressors, etc.) shells or casings, ships hulls, large dynamoelectric machines (motors, generators, etc.), or any other suitable curved surface. The platform 200 provides a stable surface, such as a step, for a technician to step on, kneel on, or otherwise use for support during service of the machine.

The adjustable working platform 200 includes a support member 210 that may be configured to be inserted into a hole (120 or 125) in the curved surface 130. The support member includes a plurality of spring-loaded balls 212 configured to interact with the hole 120. The hole 120 may be a nozzle pin hole in the gas turbine shell 100, and in this example the curved surface 130 is the interior of a gas turbine shell. An adjustable surface 220 (e.g., a step) is configured for supporting a load, such as a technician or tool, and the adjustable surface 220 is configured to rotate and lock in multiple positions. An anti-rotation arm 230 is connected to the support member 210, and the anti-rotation arm 230 includes an adjustable section 232 configured to engage an axial facing portion 460 of the curved surface 130.

The support member 210 also includes one or more disc shaped members 214 located at opposing axial surfaces thereof. The disc shaped members 214 have a plurality of axially-aligned holes 216. The axially-aligned holes 216 are configured to permit the adjustable surface 220 to lock in multiple positions. The adjustable surface 220 includes a substantially planar working surface connected to two orthogonally disposed legs 222, and each of the legs has a U-shaped opening 223 configured to slide over a portion of the support member 210. Each of the legs 222 may have one or more holes 224 configured to interact with the axially-aligned holes 216 in the support member 210. The holes 224 in the adjustable surface 220 and the axially-aligned holes 216 in the support member 210 are configured to accept a quick release ball lock pin 240.

The quick release ball lock pin 240 is configured to lock the adjustable surface 220 in a desired position. Quick release ball lock pins are positive locking pins that will not release until the button 242 on the handle 244 is depressed. When button 242 is depressed, balls 246 are retracted into the shank, which then allows the shank to be pulled out of holes 224 and 216. The method for inserting the pin 240 is simply reversed, depress button 242, insert shank into hole(s), release button. The pin 240 may be comprised of 17-4 stainless steel (which provides high shear strength and excellent corrosion resistance), 300 series stainless steel (which has low shear strength but excellent corrosion resistance), or 4130 alloy steel (which provides high shear strength and low corrosion resistance). The handle 244 may alternatively comprise a button handle, ring handle, T-handle (as shown), L-handle, or dome handle. It is to be understood that any suitable mechanical fastener providing the required strength could be used in place of pin 240, for example, nuts and bolts, pin and cotter pin, etc.

The anti-rotation arm 230 may be formed integrally with support member 210, or the arm 230 may be mechanically fastened to support member 210 (as shown). The anti-rotation may extend into the support member 210 and both the anti-rotation arm and the support member are configured to be fastened together by a quick release ball lock pin. A portion of anti-rotation arm 230 is configured to slip into support member 210, by having a reduced diameter portion. This portion includes a hole through which quick release ball lock pin 250 may be passed. In use, arm 230 is inserted into support member 210, a hole in the arm 230 and a hole in the support member are aligned, and then the pin 250 is inserted. The arm is not securely fastened to support member 210. In alternative embodiments, the arm 230 could include an externally threaded portion that is screwed into an internally threaded portion of support member 210, or any other suitable attachment means may be employed. The anti-rotation arm 230 may also be attached to one side (as shown) of the support member 210, the other side (not shown), or both sides (not shown) if two anti-rotation arms are employed.

The anti-rotation arm 230 may include an externally threaded shaft 234 configured to interact with internal threads on the adjustable section 232. The adjustable section 232 may be screwed out or in to contact an axial facing portion 460 of the curved surface 130 to lock the adjustable working platform 100 and prevent undesired rotation thereof. The platform 100 is prevented from rotation by forces acting in opposite directions on the support member 210 in hole 120, and the distal end of the adjustable section 232 in contact with the axial facing portion. For example, the distal end may be rotated out until it contacts the axial facing portion 460, and when it is sufficiently tightened the platform is locked in place and rotation about the vertical shaft of support member 210 is prevented.

Figure 3:
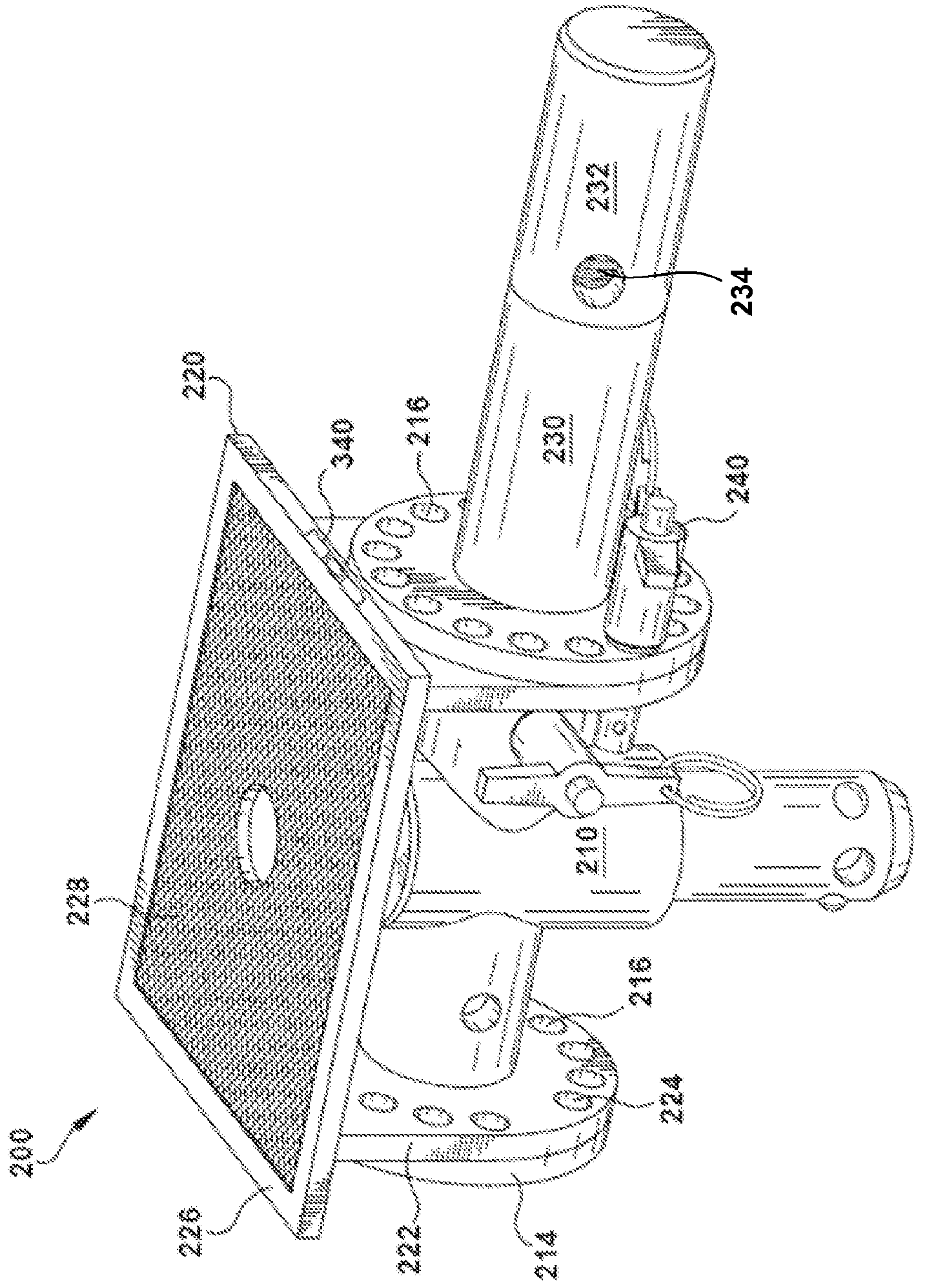
FIG. 3 illustrates a perspective view of adjustable working platform, according to an aspect of the present invention.

FIG. 3 illustrates a perspective view of adjustable working platform 200. The adjustable surface 220 includes a substantially planar working surface 226 that may have a non-skid coating 228 configured to increase traction of the substantially planar working surface 226. The non-skid coating 228 could be a knurled surface of adjustable surface 220, or a coating or layer on non-skid material. For example, a high friction, slip resistant tape or paint/abrasive mix could be applied to the surface 226. A rubber layer could also be attached to the surface 220 to increase traction. The adjustable working platform 200 may also include a level indicating device 340 configured to facilitate setting the substantially planar working surface 220 along a substantially horizontal plane. The level indicating device may be a bubble level that is inset within a side surface of the adjustable surface 220, of the level 340 may be adhesively or magnetically attached to adjustable surface 226.

Figure 4:
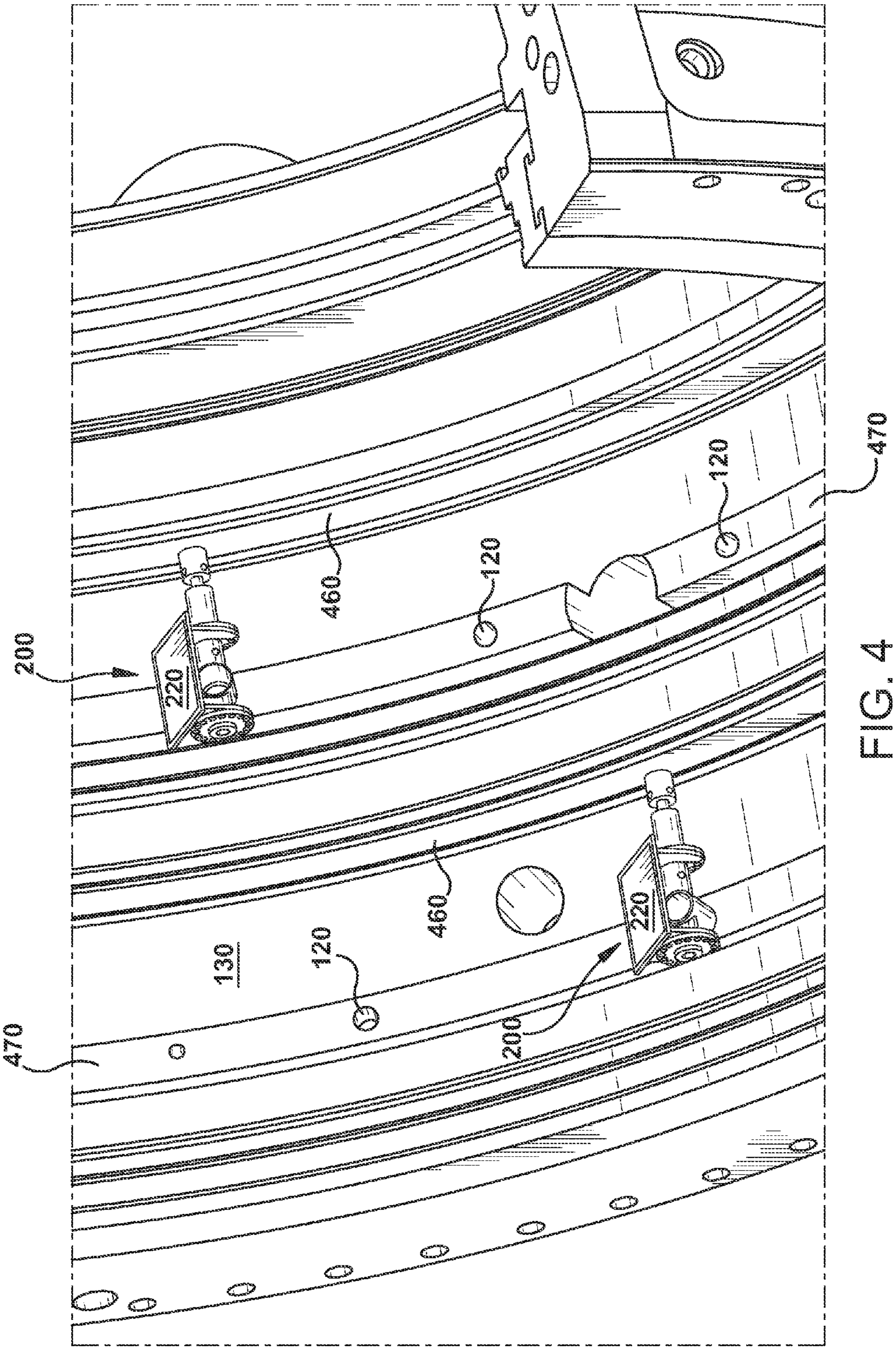
FIG. 4 illustrates a perspective view of the adjustable working platform attached to the interior of a turbine shell, according to an aspect of the present invention.

FIG. 4 illustrates a perspective view of the adjustable working platform 200 attached to the interior of a turbine shell, according to an aspect of the present invention. The support member 210 is inserted into a hole 120 in the curved surface. Rib 470 includes multiple holes 120 that may be used for nozzle pins. The adjustable surface 220 can support a load (such as a technician, a technician's foot or tool), and the adjustable surface 220 has been rotated and locked in a substantially horizontal position. The adjustable section 232 of the anti-rotation arm 230 has been moved to engage an axial facing portion 460 of the curved surface 130. In this configuration, the platform 200 can't rotate due to the forces exerted on the axial facing portion 460 and rib 470 of shell 100.

Figure 5:
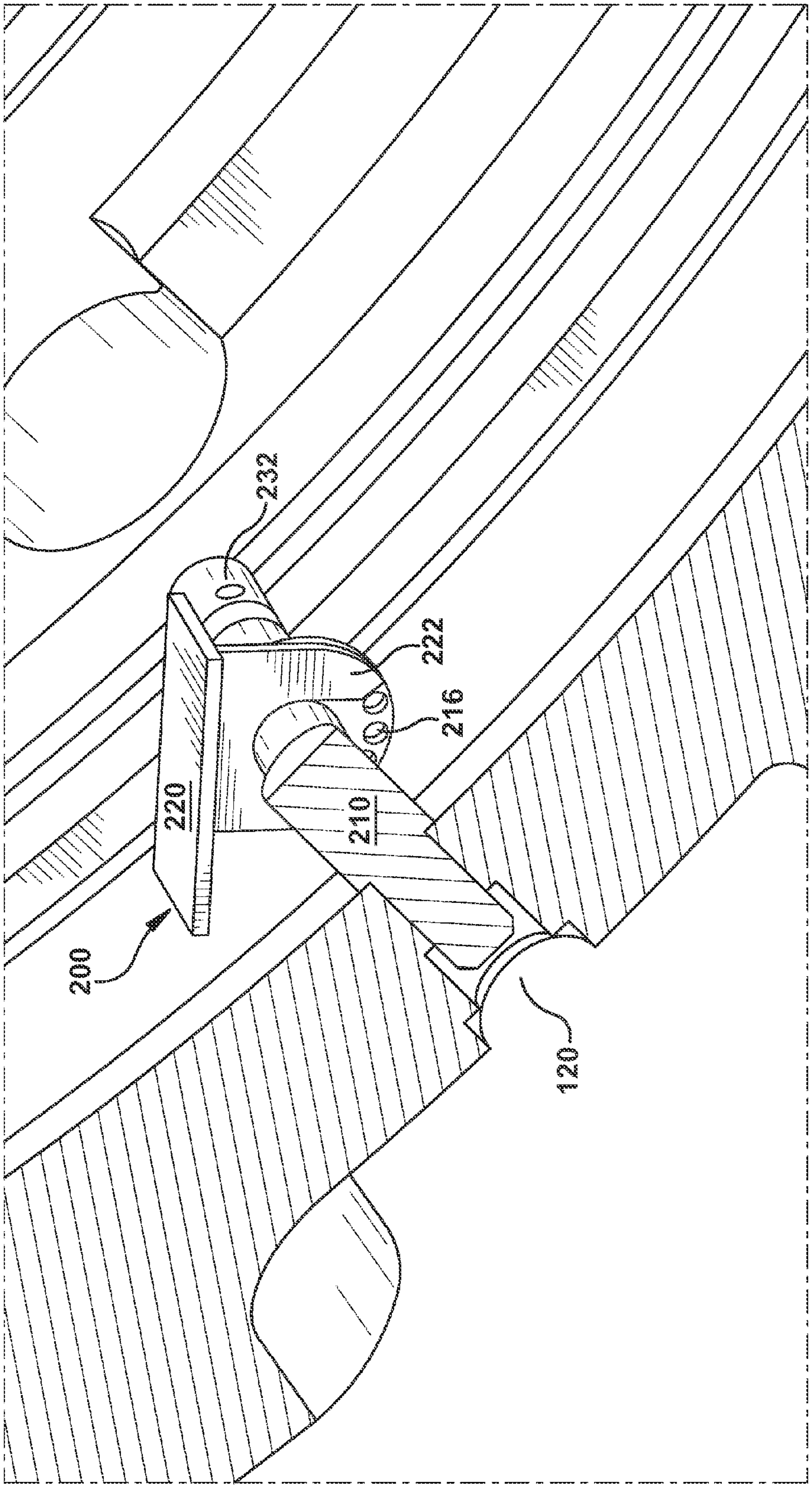
FIG. 5 illustrates a hybrid cross-sectional/perspective view of the adjustable working platform attached to the interior of a turbine shell, according to an aspect of the present invention.

FIG. 5 illustrates a hybrid cross-sectional/perspective view of the adjustable working platform 200 attached to the interior of a turbine shell, according to an aspect of the present invention. A portion of the support member 210 is shown inside hole 120. Only about half of the adjustable working platform 200 is shown, but this is to illustrate how the support member 210 functions inside hole 120. After insertion, the adjustable section 232 can be screwed out until it makes contact with axial facing portion 460. To remove the adjustable working platform 200, the process is reversed and the adjustable section is rotated in the opposite direction to retract it from the axial facing portion 460 followed by pulling the entire platform 200 and support member 210 out of hole 120. The platform 200 may then be moved to another location. It is to be understood that the support member 210 could be replaced by a clamp member that clamps anywhere along rib 470 and this clamp may include projections that insert within hole 120 or other holes present in shell 100.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An adjustable working platform for a curved surface, the curved surface is an interior of a gas turbine shell, the platform comprising:

a support member configured to be inserted into a hole in the curved surface, the support member having one or more disc shaped members located at opposing axial surfaces, the one or more disc shaped members having a plurality of axially-aligned holes, the plurality of axially-aligned holes are configured to permit the adjustable surface to lock in multiple positions;

an adjustable surface configured for supporting a load, the adjustable surface configured to rotate and lock in multiple positions, the adjustable surface having one or more legs configured to extend over a portion of the support member, each of the one or more legs having one or more holes configured to interact with the plurality of axially-aligned holes in the support member, the one or more holes in the adjustable surface and the plurality of axially-aligned holes in the support member are configured to accept a quick release ball lock pin, the quick release ball lock pin configured to lock the adjustable surface in a desired position; and an anti-rotation arm connected to the support member, the anti-rotation arm including an adjustable section configured to engage an axial facing portion of the curved surface.

2. The adjustable working platform of claim 1, the support member further comprising:

a plurality of spring-loaded balls configured to interact with the hole; and wherein the hole is a nozzle pin hole in the gas turbine shell.

3. The adjustable working platform of claim 1, the adjustable surface further comprising:

a substantially planar working surface connected to two orthogonally disposed legs, each of the legs having a U-shaped opening configured to slide over a portion of the support member.

4. The adjustable working platform of claim 3, the substantially planar working surface further comprising:

a non-skid coating configured to increase traction of the substantially planar working surface.

5. The adjustable working platform of claim 3, the adjustable surface further comprising:

a level indicating device configured to facilitate setting the substantially planar working surface along a substantially horizontal plane.

6. The adjustable working platform of claim 1, the anti-rotation arm further comprising:

an externally threaded shaft configured to interact with internal threads on the adjustable section, and wherein the adjustable section may be screwed out or in to contact the axial facing portion of the curved surface to lock the adjustable working platform and prevent undesired rotation thereof.

7. The adjustable working platform of claim 6, wherein the anti-rotation arm extends into the support member and both the anti-rotation arm and the support member are configured to be fastened together by a quick release ball lock pin.

8. An adjustable working platform for a curved surface, the platform comprising:

a support member configured to be inserted into a hole in the curved surface, wherein the curved surface is the interior of a gas turbine shell, the support member having a plurality of spring-loaded balls configured to interact with the hole, wherein the hole is a nozzle pin hole in the gas turbine shell, and the support member having one or more disc shaped members located at opposing axial surfaces, the one or more disc shaped members having a plurality of axially-aligned holes, the plurality of axially-aligned holes are configured to permit an adjustable surface to lock in multiple positions;

the adjustable surface configured for supporting a load, the adjustable surface configured to rotate and lock in multiple positions, the adjustable surface having one or more legs configured to extend over a portion of the support member, each of the one or more legs having one or more holes configured to interact with the plurality of axially-aligned holes in the support member, and wherein the one or more holes in the adjustable surface and the plurality of axially-aligned holes in the support member are configured to accept a quick release ball lock pin, the quick release ball lock pin configured to lock the adjustable surface in a desired position; and an anti-rotation arm connected to the support member, the anti-rotation arm including an adjustable section configured to engage an axial facing portion of the curved surface.

9. The adjustable working platform of claim 8, the adjustable surface further comprising:

a substantially planar working surface connected to two orthogonally disposed legs, each of the legs having a U-shaped opening configured to slide over a portion of the support member.

10. The adjustable working platform of claim 9, the anti-rotation arm further comprising:

an externally threaded shaft configured to interact with internal threads on the adjustable section, and wherein the adjustable section may be screwed out or in to contact the axial facing portion of the curved surface to lock the adjustable working platform and prevent undesired rotation thereof.

11. The adjustable working platform of claim 10, wherein the anti-rotation arm extends into the support member and both the anti-rotation arm and the support member are configured to be fastened together by a quick release ball lock pin.

12. The adjustable working platform of claim 11, the substantially planar working surface further comprising:

a non-skid coating configured to increase traction of the substantially planar working surface.

13. The adjustable working platform of claim 12, the adjustable surface further comprising:

a level indicating device configured to facilitate setting the substantially planar working surface along a substantially horizontal plane.

14. An adjustable working platform for a curved surface, the curved surface is an interior of a gas turbine shell, the platform comprising:

a support member configured to be inserted into a hole in the curved surface, the support member having one or more disc shaped members located at opposing axial surfaces, the one or more disc shaped members having a plurality of axially-aligned holes;

an adjustable surface configured for supporting a load, the adjustable surface configured to rotate and lock in multiple positions, the adjustable surface having one or more legs configured to extend over a portion of the support member, each of the one or more legs having one or more holes configured to interact with the plurality of axially-aligned holes in the support member, the one or more holes in the adjustable surface and the plurality of axially-aligned holes in the support member are configured to accept a quick release ball lock pin that is configured to lock the adjustable surface in a desired position, the plurality of axially-aligned holes in the support member are configured to permit the adjustable surface to lock in multiple positions; and an anti-rotation arm connected to the support member, the anti-rotation arm including an adjustable section configured to engage an axial facing portion of the curved surface.

15. The adjustable working platform of claim 14, the support member further comprising:

a plurality of spring-loaded balls configured to interact with the hole; and wherein the hole is a nozzle pin hole in the gas turbine shell.

16. The adjustable working platform of claim 14, the adjustable surface further comprising:

a substantially planar working surface connected to two orthogonally disposed legs, each of the legs having a U-shaped opening configured to slide over a portion of the support member.

17. The adjustable working platform of claim 16, the substantially planar working surface further comprising:

a non-skid coating configured to increase traction of the substantially planar working surface.

18. The adjustable working platform of claim 14, the adjustable surface further comprising:

a level indicating device configured to facilitate setting the substantially planar working surface along a substantially horizontal plane.

19. The adjustable working platform of claim 14, the anti-rotation arm further comprising:

an externally threaded shaft configured to interact with internal threads on the adjustable section, and wherein the adjustable section may be screwed out or in to contact the axial facing portion of the curved surface to lock the adjustable working platform and prevent undesired rotation thereof.

20. The adjustable working platform of claim 14, wherein the anti-rotation arm extends into the support member and both the anti-rotation arm and the support member are configured to be fastened together by a quick release ball lock pin.

* * * * *